United States Patent [19]

LaSala et al.

[11] 4,019,389
[45] Apr. 26, 1977

[54] VISCOUS DAMPER
[75] Inventors: Jerry Frank LaSala, Pompton Plains; Walter Joseph Krupick, Succasana, both of N.J.
[73] Assignee: The Singer Company, Little Falls, N.J.
[22] Filed: Feb. 11, 1976
[21] Appl. No.: 657,116
[52] U.S. Cl. .................................. 73/430; 73/522; 188/1 B; 188/276
[51] Int. Cl.² ..................... G01D 11/12; F16F 9/52
[58] Field of Search ............ 73/430, 496, 526, 522; 188/1 B, 276

[56] References Cited
UNITED STATES PATENTS

| | | | |
|---|---|---|---|
| 1,902,787 | 3/1933 | Duesenberg | 188/1 B |
| 2,292,072 | 8/1942 | Hanna et al. | 188/1 B X |
| 2,590,940 | 4/1952 | Collins | 73/493 X |
| 2,819,775 | 1/1958 | Everett | 188/1 B |
| 3,107,752 | 10/1963 | McLean | 188/276 |
| 3,835,320 | 9/1974 | Helwig | 73/430 X |

Primary Examiner—Richard C. Queisser
Assistant Examiner—John S. Appleman
Attorney, Agent, or Firm—Thomas W. Kennedy

[57] ABSTRACT

A viscous damper for damping linear vibrations along an axis to isolate a precision instrument such as a vibrating beam accelerometer having a divided sealed cavity containing a damping fluid with a diaphragm disposed on each side of the division and a narrow gap coupling the spaces next to the two diaphragms, the diaphragms coupled respectively between an internal and an external mount with the instrument to be protected mounted to the internal mount and the external mount mounted to the body to which the instrument is attached.

13 Claims, 3 Drawing Figures

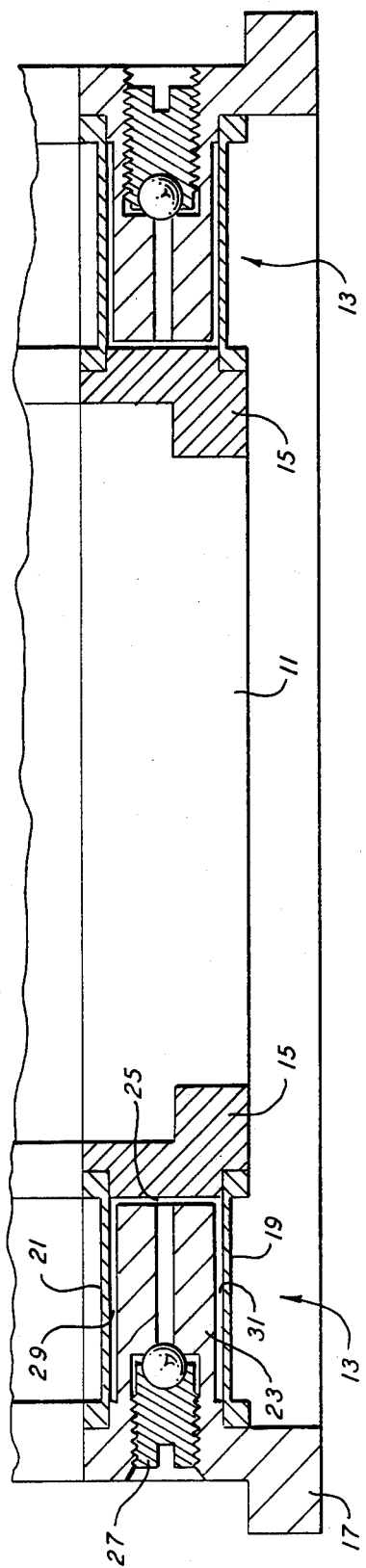
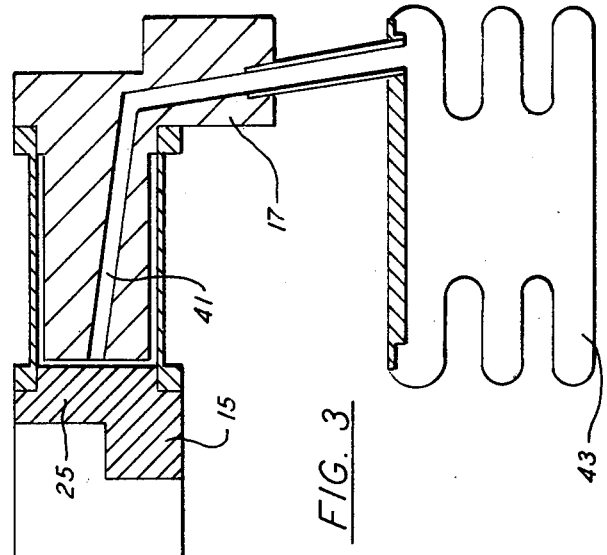
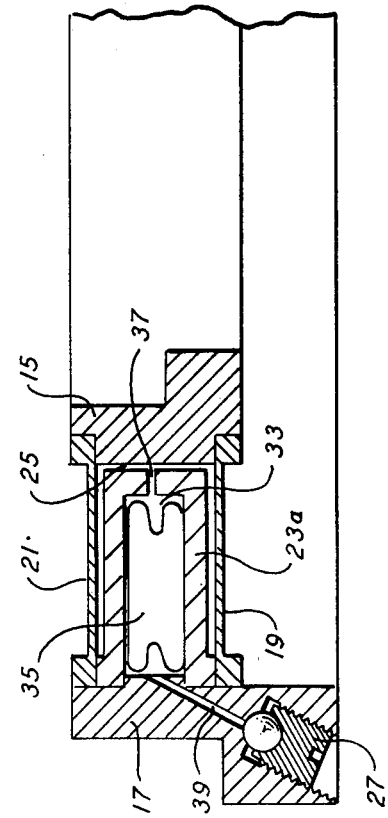

VISCOUS DAMPER

BACKGROUND OF THE INVENTION

This invention relates to the damping of linear vibrations in general and more particularly to an improved viscous damper for use with precision instruments such as vibrating beam accelerometers.

A vibrating beam accelerometer is disclosed in co-pending applications Ser. Nos. 599,126 and 498,035 filed respectively on July 25, 1975 and Aug. 16, 1974 and assigned to the same assignee as the present invention. In such instruments, errors can result because of linear vibration. However, instruments of this nature which require ultimate angular stability are not usually isolated from vibration because isolators normally have an instability. Attempts have been made to accomplish vibration isolation using a single diaphragm without viscous damping. However, in such arrangements it was not possible to obtain minimum angular coupling with low hysteresis. Such a system, which could be considered a single spring system, did not provide adequate angular stability.

Thus, in view of these various difficulties the need for an improved means for damping linear vibration along an axis to isolate a precision instrument such as a vibrating beam accelerometer which provides high damping and low angular coupling is evident.

SUMMARY OF THE INVENTION

The present invention provides a solution to this problem. In essence, the viscous damper of the present invention includes a divided sealed cavity containing a damping fluid with a diaphragm disposed on each side of the division with a narrow gap coupling the spaces adjacent the two diaphragms. The diaphragms are coupled respectively between an internal and an external mount. The instrument to be protected is coupled to the internal mount with the external mount coupled to the body to which the instrument is attached. In the illustrated embodiment, two such arrangements are provided one at each end of an instrument such as a vibrating beam accelerometer for attaching it to the body where acceleration is to be measured.

Through this arrangement a damping isolation system with a high level of damping and minimum angular coupling and low hysteresis is obtained. Placing the two diaphragms spaced a distance apart increases angular stability over that which would be present in a single spring system. The use of two diaphragms allows linear motion and provides a fluid seal. The diaphragm spring rate and mass of the instrument will, of course, determine the natural frequency of the damping system and using conventional design techniques with these input values the arrangement can be designed to avoid any undesired oscillations at the natural frequency.

BRIEF DESCRIPTION OF THE DRAWINGS

FIG. 1 is a cross-sectional view through a first and preferred embodiment of the present invention.

FIG. 2 is a similar view of a first alternate embodiment.

FIG. 3 is a similar view of a second alternate embodiment.

DETAILED DESCRIPTION OF THE PREFERRED EMBODIMENT

FIG. 1 illustrates a first embodiment of the present invention. This embodiment is the invention in its simpliest form and is particularly useful where the operating temperature range is small. The instrument to be protected such as a vibrating beam accelerometer 11 is mounted between two damping arrangements 13 of identical construction. Only the arrangement 13 on the lefthand side will be explained in detail. The instrument 11 is mounted between two cylindrical internal flanges 15. Each of the flanges 15 is coupled to an external flange 17 by means of a pair of cylindrical diaphragms 19 and 21. The flange 17 has a projecting portion 23 which extends into the gap between the diaphragms 19 and 21 to divide it and to define a small gap 25 between itself and inner flange 15. Extension 23 could equally well be formed on the inner flange 15 as on the outer flange 17. The internal space between the extension 23, the inner flange 15 and the diaphragms 19 and 21 is filled with a damping fluid. The damping fluid is sealed by using seal screws 27 which screw into a suitable opening formed in the flange 17. Preferably, the diaphragms are attached to the flanges 15 and 17 by welding or brazing. The external flanges 17 then mount to the platform where acceleration is to be measured by the instrument 11.

In operation, linear vibrations along the input axis alternately increase and decrease the spaces 29 and 31 between the projection 23 and the diaphragms 21 and 19 respectively. This causes fluid to flow back and forth through the restricted gap 25. The small gap results in relatively high damping. As noted above, the natural frequency of the damper will be a function of the diaphragm spring rate and the mass of the instrument. Proper selection of a spring rate based on the instrument mass will result in the avoidance of any undesired oscillations. In this arrangement, which as noted above is for use where the operating temperature range is small, no bellows is required. The normal compliance of the fluid, due to small amounts of absorbed gas, along with the ability of the diaphragms to expand outward a small amount, allows some change in volume.

FIG. 2 illustrates a first alternate embodiment of the present invention. In this arrangement the flanges 15 and 17 along with the diaphragms 19 and 21 are essentially as they were in the previous embodiment. However, in this arrangement the flange includes a separate extension member 23a having an internal cavity 33 into which is placed a gas-filled bellows 35. A fluid passage 37 is established between the cavity 33 and the gap 25. This passage is placed at the center which is the neutral point. The bellows spring rate exerts a preload on the fluid which is high enough to reduce non-linear damping effects due to the presence of gas in the fluid. By keeping the inlet at the neutral pressure point and keeping it relatively small, the bellows spring rate does not affect the damping. In this arrangement filling and sealing is done through the passage 39 with a sealing screw 27 again used, the screw this time being inserted in a suitable opening in the outside of the flange 17.

Another alternate embodiment is illustrated by FIG. 3. Once again, the flanges 15 and 17 and the diaphragms 19 and 21 are as in FIGS. 1 and 2. The primary difference in this embodiment is that the flange 17 has a channel 41 formed therein which couples to a bellows 43 located external of the device. The bellows 43 is filled with the damping fluid which is in fluid communication with the spaces adjacent the diaphragms. The effects here are essentially as those obtained with the embodiment of FIG. 2. Once again, the inlet is at the neutral point of the gap 25 to minimize any effect of the bellows on the damping.

Thus, an improved apparatus for damping linear vibrations in an instrument such as a vibrating beam accelerometer has been shown. Although specific embodiments have been illustrated and described, it will be obvious to those skilled in the art that various modifications may be made without departing from the spirit of the invention which is intended to be limited solely by the appended claims.

We claim:

1. Apparatus for damping linear vibrations along an axis to isolate a precision instrument such as a vibrating beam accelerometer comprising:
   a. an external flange for mounting the apparatus to the body to which the instrument is to be mounted;
   b. an internal flange for mounting the instrument;
   c. first and second diaphragms extending between said external and internal flanges to form a cavity bounded by said diaphragms and said flanges;
   d. means to divide said cavity extending parallel to said diaphragms and forming a narrow space adjacent each diaphragm, said means rigidly attached to one of said external and internal flanges;
   e. a single gap coupling the spaces adjacent said first and second diaphragms at the other of said external and internal flange to which said means to divide are not attached; and
   f. a damping fluid filling said narrow spaces and said gap.

2. Apparatus according to claim 1 wherein said means to divide comprise an extension of said external flange projecting toward said internal flange.

3. Apparatus according to claim 1 and further including a duplicate of the apparatus described therein, said instrument disposed between said apparatus and said duplicate thereof.

4. Apparatus according to claim 1 and further including means for filling said spaces between said dividing means and said diaphragms with said damping fluid.

5. Apparatus according to claim 4 wherein said filling means comprise a bore through said dividing means, said bore terminating essentially at the middle of said gap.

6. Apparatus according to claim 5 wherein said bore is sealed off by a seal screw mounted in said external flange.

7. Apparatus according to claim 6 wherein said seal screw is inserted into the end of said flange.

8. Apparatus according to claim 6 wherein said seal screw is inserted through the bottom of said flange.

9. Apparatus according to claim 4 and further including means to preload the fluid in said space with a pressure and to take up expansion of said fluid caused by increased heat.

10. Apparatus according to claim 1 wherein said diaphragms are metal and are attached to said flanges by a welding or brazing.

11. Apparatus according to claim 1 wherein said flanges and diaphragms are cylindrical in shape.

12. Apparatus for damping linear vibrations along an axis to isolate a precision instrument such as a vibrating beam accelerometer comprising:
   a. an external flange for mounting the apparatus to the body to which the instrument is to be mounted;
   b. an internal flange for mounting the instrument;
   c. first and second diaphragms extending between said external and internal flanges to form a cavity bounded by said diaphragms and said flanges;
   d. means to divide said cavity extending parallel to said diaphragms and forming a narrow space adjacent each diaphragm;
   e. a gap coupling the spaces adjacent said first and second diaphragms;
   f. a damping fluid filling the said narrow spaces and said gap;
   g. a bore through said dividing means, said bore terminating essentially at the middle of said gap;
   h. a cavity in communication with said bore formed within said means to divide said cavity in communication with said gap through said bore, and
   i. a gas filled bellows disposed within said cavity, whereby said bellows preload said fluid and compensate for expansion thereof.

13. Apparatus for damping linear vibrations along an axis to isolate a precision instrument such as a vibrating beam accelerometer comprising;
   a. an external flange for mounting the apparatus to the body to which the instrument is to be mounted;
   b. an internal flange for mounting the instrument;
   c. first and second diaphragms extending between said external and internal flanges to form a cavity bounded by said diaphragms and said flanges;
   d. means to divide said cavity extending parallel to said diaphragms and forming a narrow space adjacent each diaphragm;
   e. a single gap coupling the spaces adjacent said first and second diaphragms;
   f. a damping fluid filling the said narrow spaces and said gap;
   g. a bore through said dividing means, said bore terminating essentially at the middle of said gap; and
   h. a bellows external to said apparatus coupled thereto through said bore, said bellows being filled with damping fluid in communication with said damping fluid in said apparatus.

* * * * *